Jan. 23, 1945.   C. E. BASTON ET AL   2,367,919
LOCOMOTIVE CONTROL SYSTEM
Filed June 10, 1943   2 Sheets-Sheet 1
*Fig. 1.*
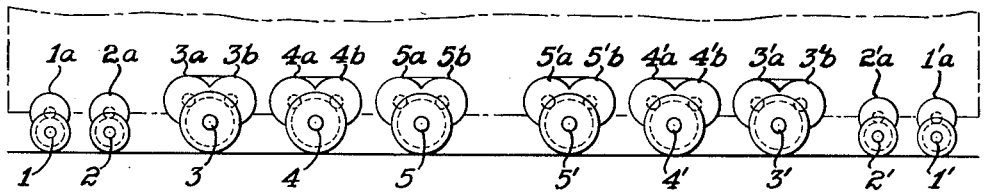
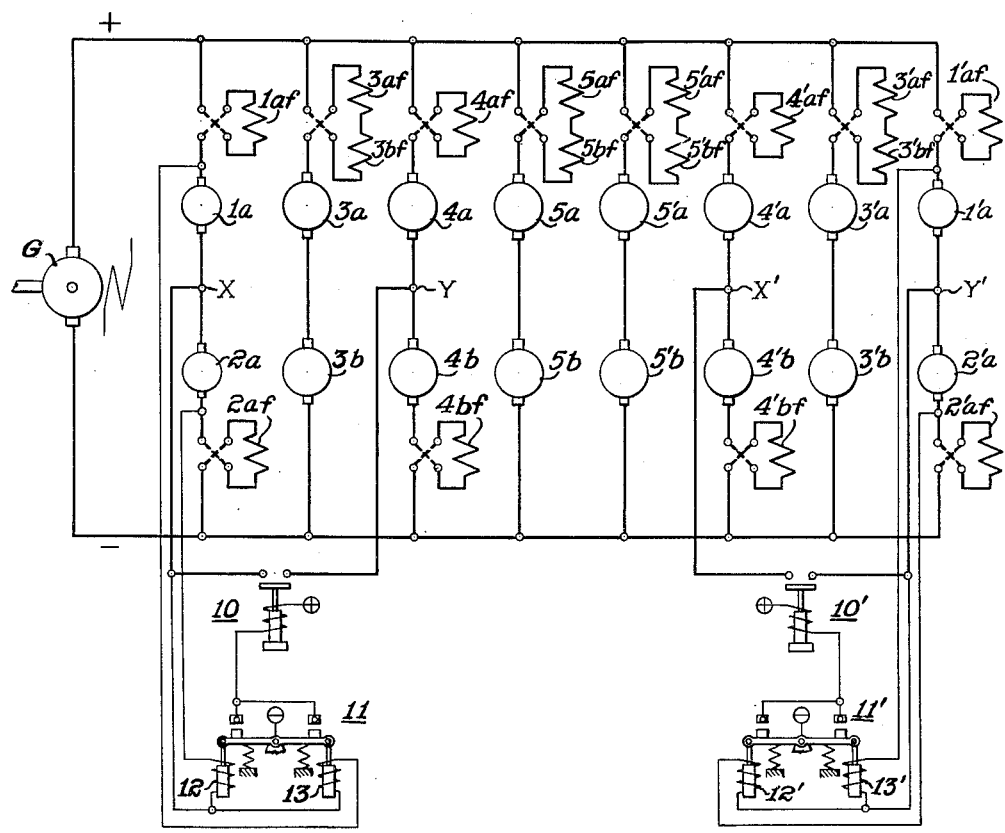
*Fig. 2.*
WITNESSES:
INVENTORS
Cyril E. Baston and
Lloyd J. Hibbard.
BY
ATTORNEY Jan. 23, 1945.   C. E. BASTON ET AL   2,367,919
LOCOMOTIVE CONTROL SYSTEM
Filed June 10, 1943   2 Sheets-Sheet 2

WITNESSES:

INVENTORS
Cyril E. Baston and
Lloyd J. Hibbard.
BY
ATTORNEY

Patented Jan. 23, 1945

2,367,919

UNITED STATES PATENT OFFICE 2,367,919

LOCOMOTIVE CONTROL SYSTEM

Cyril E. Baston, Irwin, and Lloyd J. Hibbard, Forest Hills, Pa., assignors to Westinghouse Electric & Manufacturing Company, East Pittsburgh, Pa., a corporation of Pennsylvania Application June 10, 1943, Serial No. 490,304

15 Claims. (Cl. 172—179)

Our invention relates, generally, to control systems and, more particularly, to systems for controlling the operation of electric locomotives.

In the design and application of electric locomotives, the present trend is to place the maximum amount of power in a single unit. However, a point is reached where the increase in power is limited by the adhesion between the rail and the driving wheels. In order to utilize the total weight of the locomotive for adhesion, motors are being added to the leading and trailing trucks.

It has been found that the driving motors for the truck axles have a tendency to slip even when designed to operate at a much lower percent adhesion than the main drivers. This is undoubtedly due to the fact that the truck wheels which encounter the slippery rail first, afford some cleaning action which benefits the drivers.

Furthermore, it has been demonstrated in actual service that if motors having a rather flat speed-tractive-effort characteristic are connected in parallel across a generator the wheels on losing their grip on the rail and starting to slip have their torque reduced faster than the adhesion decreases. Therefore, further acceleration is prevented, resulting in a creeping of the driver rather than a spinning. This action is beneficial from two standpoints, first, the adhesion instead of dropping to from 4 to 7 percent, remains at approximately 10 to 15 percent, and, second, the motor is prevented from overspeeding.

With motors having twin armatures geared to the same driving axle, these two armatures may be connected in series since they cannot slip with respect to each other and they may be considered as a single motor. Therefore, on a locomotive having a plurality of main axles each driven by a pair of twin armatures and a plurality of truck axles each of which is driven by a single armature, the series-connected twin armatures may be connected in parallel across a generator without danger of the motors overspeeding.

It is desirable to connect the armatures of the motors on the axles of each of the trucks in series with each other. However, since these motors are geared to different axles, it is necessary to devise some means of preventing overspeeding of these motors.

Accordingly, an object of our invention, generally stated, is to provide a control system for an electric locomotive which shall be simple and efficient in operation and which may be economically manufactured and installed.

A more specific object of our invention is to so control the operation of series-connected motors that the anti-slipping effect of parallel connections is obtained.

Another object of our invention is to provide an anti-slip control scheme which may be utilized with a locomotive having one or more generators for supplying power to the driving motors.

Other objects of our invention will be explained fully hereinafter or will be apparent to those skilled in the art.

In accordance with one embodiment of our invention, spinning of the series-connected truck motors of a locomotive is prevented by establishing an equalizing connection from the common connection between the truck motors to the common connection between a pair of the twin armature motors for one of the main drivers, thereby preventing a rapid acceleration of either of the truck motors relative to the other motors.

For a fuller understanding of the nature and objects of our invention, reference may be had to the following detailed description, taken in conjunction with the accompanying drawings, in which:

Figure 1 is a diagrammatic view showing the mechanical arrangement of the main driving wheels and motors and the truck wheels and motors of an electric locomotive utilizing our invention;

Fig. 2 is a diagrammatic view of a control system embodying our invention;

Figure 3:
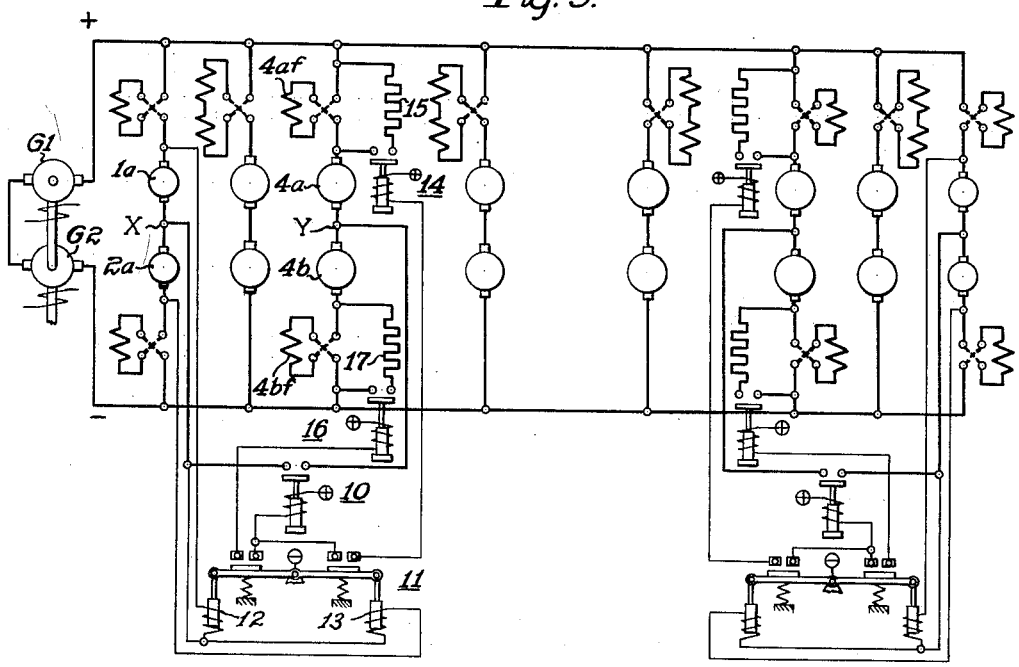
Fig. 3 is a diagrammatic view of a modification of our invention.

Referring to the drawings, the locomotive represented diagrammatically in Fig. 1 may be of the articulated type having leading truck axles I and 2 and driving axles 3, 4 and 5 disposed at one end thereof and trailing truck axles I' and 2' and driving axles 3', 4' and 5' disposed at the other end thereof. Since the two sections of the locomotives are symmetrical in design, the locomotive may be operated in either direction.

As explained hereinbefore, motors are provided for the truck axles as well as the driving axles in order to increase the tractive effort of the locomotive. Thus the truck axles I and 2 are provided with motors Ia and 2a, respectively. Likewise, the truck axles I' and 2' are provided with motors I'a and 2'a, respectively. The motors for each one of the main driving axles are mounted in a twin frame and the armatures are geared to the same axle. Thus, the armatures for motors 3a and 3b are geared to the axle 3, the armatures for motors 4a and 4b are geared to the axle 4 and the armatures for motors 5a and 5b are geared to the axle 5. Likewise, the armatures for the motors 3'a, 3'b; 4'a, 4'b and 5'a, 5'b are geared to their respective axles. In this manner, it is impossible for the armatures of the twin motors to slip relative to each other. However, as explained hereinbefore, the motors for the truck axles may slip, since each armature is geared to an individual axle.

In order to overcome the tendency of the truck motors to slip and to prevent dangerous overspeeding of these truck motors, we provide for establishing an equalizing connection from the common connection between the series connected motors 1a and 2a, designated as the point X, to the common connection between the series connected motors 4a and 4b, designated as the point Y in Fig. 2 of the drawings.

The equalizing connection may be established through a switch 10, the operation of which may be controlled by a relay 11. The relay 11 may be of the balanced-beam type having one actuating coil 12 connected across the armature of the motor 2a and another actuating coil 13 connected across the armature of the motor 1a.

It will be noted that the field windings for the truck motors 1a and 2a and for the driving motors 4a and 4b must be kept closely associated with their own armatures. Thus, separate reversing switches are provided for the field windings 1af and 2af and also for the field windings 4af and 4bf. A single reversing switch may be utilized for both of the field windings 3af and 3bf. Likewise, a single reversing switch may be utilized for the field windings 5af and 5bf. The power for operating the motors may be supplied by a single generator G which may be driven by an electric motor (not shown), or by a Diesel engine or other suitable prime mover.

The equalizing connection between the points X and Y functions in the following manner: Assume that the truck wheels geared to the motor 1a start to slip and that the motors 2a, 4a and 4b continue rotating at the same speed. The increase in speed of the motor 1a causes it to generate a higher counter electromotive force, thereby creating an unbalance between the voltages of the motors 1a and 2a, and operating the relay 11, which, in turn, causes the switch 10 to close to establish the connection between the points X and Y.

Were it not for the connection X—Y, the voltage between the positive conductor and the point X would rise the same amount and the current through the motor 1a would drop, thereby reducing the counter electromotive force generated by the armature 2a and still further increase the voltage of the armature 1a. This cumulative action would continue until spinning takes place.

However, with the connection X—Y established, the potential of the point Y must rise with the potential of the point X. The only way that the point Y can change in potential is for the motor 4a to draw a higher current from the power source, thereby strengthening its field. This increased current must divide between the motors 2a and 4b, which it will in approximately equal amounts, thereby strengthening the fields of these motors.

The strengthening of the fields of the motors 2a and 4b causes them to generate a higher counter electromotive force. The sum of the counter electromotive forces generated by the motors 1a and 2a plus the resistance drops through these motors must always equal the voltage between the positive and negative buses. Therefore, the rise encountered in the counter electromotive forces of the motors 2a and 2b must be accompanied by a corresponding drop in the counter electromotive force of the motor 1a and hence it must slow down in speed. In this manner the action is such as inherently to prevent a rapid acceleration of the truck wheels driven by the motor 1a. Thus, the desired result of preventing overspeeding of the motor is accomplished.

It will be understood that a similar action takes place in the event of slipping of the motor 2a. Likewise, the truck motors 1'a and 2'a are prevented from spinning by the operation of a switch 10' and a relay 11' to establish a connection between the points X' and Y'.

From the foregoing description, it will be seen that before the corrective action can take place, the voltage from the positive bus to the point X must increase to bring into action the corrective forces. The effect of this increase in voltage is to tend to continue the creeping slip and prevent the wheels from gripping the rail and returning to normal operation.

A modification of the foregoing system which provides an improvement in its functioning is illustrated in Fig. 3. As shown in Fig. 3, a shunt connection around the field winding 4af for the motor 4a may be established by a switch 14 which connects a resistor 15 across the field winding 4af. Likewise, a switch 16 is provided for connecting a resistor 17 across the field winding 4bf. The operation of the switches 14 and 16 may be controlled by the relay 11 which, as explained hereinbefore, is responsive to an unbalance in the voltages of the motors 1a and 2a and is, therefore, responsive to any difference in the speeds of these motors.

Thus, in the event of slipping of the motor 1a, the switch 10 is closed to establish the connection between the points X and Y, as hereinbefore explained, and also the switch 14 is closed to establish a shunt around the field winding 4af through the resistor 15.

The shunting of the field winding for the motor 4a causes it to draw additional current through its field in order to generate a counter electromotive force equal to that of the slipping motor 1a. The value of this shunted current and consequently the value of the additional current can be so adjusted that the counter electromotive force generated by each of the motors 2a and 4b is more than one-half of the bus voltage, thereby actually reducing the voltage across the motor 1a and further assisting that motor in returning to its normal operation.

The relay 11 would immediately return to its balanced condition but the switches 14 and 10 may be of the retarded type having a time delay in the opening of the contact members of these switches after the deenergization of their actuating coils by the operation of the relay 11 to open its contact members. In this manner, the switches 10 and 14 are prevented from opening until the motor 1a has time to decelerate and again grip the rail. A similar action takes place in the event of slipping of the motors 2a, 1'a or 2'a.

Figure 4:
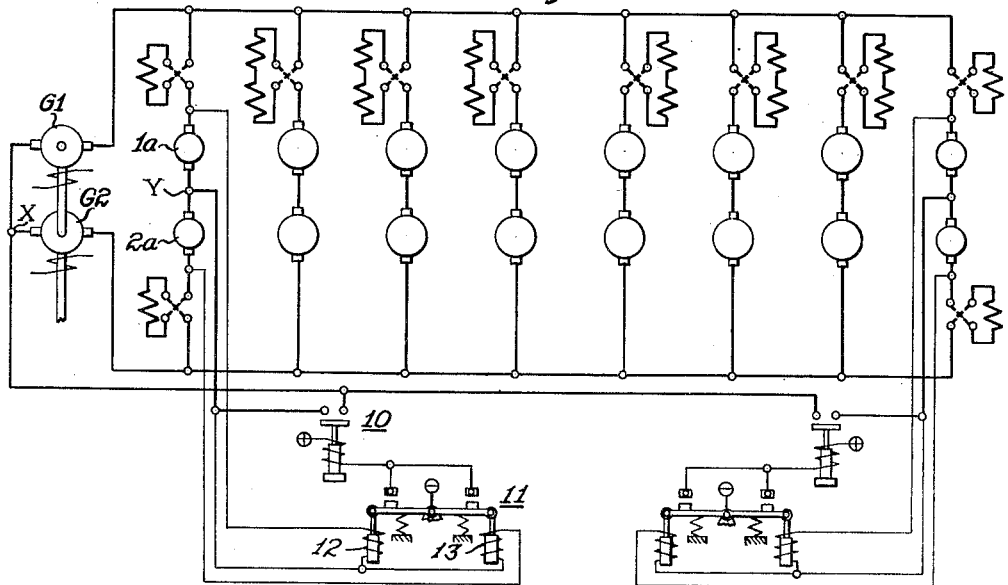
Fig. 4 is a diagrammatic view of another modification of our invention.

The foregoing schemes will operate satisfactorily with either one generator supplying the power for the motors, as shown in Fig. 2, or two generators, as shown in Fig. 3. In the event that two generators are utilized and these generators are connected in series-circuit relation, such as G1 and G2 illustrated in Fig. 4, the connection X—Y may be established from the common point between the generators G1 and G2 to the common point between the truck motors 1a and 2a. The operation of the switch 10 to establish the equalizing connection is controlled by the relay 11 in the manner hereinbefore described.

Assuming that the motor 1a starts to slip, the counter electromotive force generated in its armature is increased, thereby causing the relay 11 to close the switch 10 to establish the connection X—Y. However, since the motor 1a is only one of a relatively large number of motors as, for example, 16 in the present locomotive, the increase in counter electromotive force generated by this one motor has a negligible effect on the main generators. Therefore, the voltage across generator G1 and consequently across the motor 1a remains substantially unchanged. Since the counter electromotive force of the motor 1a can increase only by decreasing the resistance drop, a very small increase in speed will reduce the current and, therefore, the torque of the motor to a point which just equals that required by the slipping wheels and, therefore, spinning cannot develop. In this manner, the inherent action of the generators and the motors may be utilized to prevent overspeeding of the motors.

From the foregoing description, it is apparent that we have provided a simple and efficient means of preventing dangerous overspeeding of independently-geared, series-connected motors of a locomotive. The present scheme may be applied to any locomotive having at least one pair of series-connected motors which are geared to the same axle or a pair of series-connected generators for supplying the power to the motors. In the event that the generators are connected in parallel at low speeds and in series at high speed, both of the schemes herein described may be utilized to limit the speed of the independently geared motors.

Since numerous changes may be made in the above-described construction and different embodiments of the invention may be made without departing from the spirit and scope thereof, it is intended that all matters contained in the foregoing description or shown in the accompanying drawings, shall be interpreted as illustrative and not in a limiting sense.

We claim as our invention:

1. In a locomotive control system, in combination, a plurality of pairs of dynamoelectric machines, the machines of each pair being connected in series-circuit relation, switching means for establishing a connection from the common connection between one pair of machines to the common connection between another pair of machines, relay means responsive to an unbalance in the voltages of the machines of one pair for controlling the closing of said switching means, and means for delaying the opening of said switching means for a predetermined time interval after the operation of said relay means.

2. In a locomotive control system, in combination, a plurality of pairs of dynamoelectric machines, the machines of each pair being connected in series-circuit relation, the machines of one pair being mechanically connected to the same shaft and the machines of another pair being mechanically connected to different shafts, and means for establishing a connection from the common connection between one pair of machines to the common connection between the other pair of machines.

3. In a locomotive control system, in combination, a plurality of pairs of dynamoelectric machines, the machines of each pair being connected in series-circuit relation, the machines of one pair being mechanically connected to the same shaft and the machines of another pair being mechanically connected to different shafts, and switching means for establishing a connection from the common connection between one pair of machines to the common connection between the other pair of machines.

4. In a locomotive control system, in combination, a plurality of pairs of dynamoelectric machines, the machines of each pair being connected in series-circuit relation, the machines of one pair being mechanically connected to the same shaft and the machines of another pair being mechanically connected to different shafts, switching means for establishing a connection from the common connection between one pair of machines to the common connection between the other pair of machines, and relay means responsive to a difference in the speeds of the machines of one pair for controlling the operation of said switching means.

5. In a locomotive control system, in combination, a plurality of pairs of dynamoelectric machines, the machines of each pair being connected in series-circuit relation, the machines of one pair being mechanically connected to the same shaft and the machines of another pair being mechanically connected to different shafts, switching means for establishing a connection from the common connection between one pair of machines to the common connection between the other pair of machines, and relay means responsive to an unbalance in the voltages of the machines of one pair for controlling the operation of said switching means.

6. In a locomotive control system, in combination, a plurality of pairs of dynamoelectric machines, the machines of each pair being connected in series-circuit relation, the machines of one pair being mechanically connected to the same shaft and the machines of another pair being mechanically connected to different shafts, switching means for establishing a connection from the common connection between one pair of machines to the common connection between the other pair of machines, relay means responsive to an unbalance in the voltages of the machines of one pair for controlling the closing of said switching means, and means for delaying the opening of said switching means for a predetermined time interval after the operation of said relay means.

7. In a locomotive control system, in combination, a plurality of pairs of electric motors, the motors of each pair being connected in series-circuit relation, the motors of one pair being geared to the same axle and the motors of another pair being geared to different axles of the locomotive, and means for establishing a connection from the common connection between one pair of motors to the common connection between the other pair of motors.

8. In a locomotive control system, in combination, a plurality of pairs of electric motors, the motors of each pair being connected in series-circuit relation, the motors of one pair being geared to the same axle and the motors of another pair being geared to different axles of the locomotive, and switching means for establishing a connection from the common connection between one pair of motors to the common connection between the other pair of motors.

9. In a locomotive control system, in combination, a plurality of pairs of electric motors, the motors of each pair being connected in series-circuit relation, the motors of one pair being geared to the same axle and the motors of another pair being geared to different axles of the locomotive, switching means for establishing a connection from the common connection between one pair of motors to the common connection between the other pair of motors, and relay means responsive to a difference in the speeds of the motors of one pair for controlling the operation of said switching means.

10. In a locomotive control system, in combination, a plurality of pairs of electric motors, the motors of each pair being connected in series-circuit relation, the motors of one pair being geared to the same axle and the motors of another pair being geared to different axles of the locomotive, switching means for establishing a connection from the common connection between one pair of motors to the common connection between the other pair of motors, and relay means responsive to an unbalance in the voltages of the motors of one pair for controlling the operation of said switching means.

11. In a locomotive control system, in combination, a plurality of pairs of electric motors, the motors of each pair being connected in series-circuit relation, the motors of one pair being geared to the same axle and the motors of another pair being geared to different axles of the locomotive, means for establishing a connection from the common connection between one pair of motors to the common connection between the other pair of motors, and switching means for establishing shunt connections around the field windings of the motors which are geared to the same axle.

12. In a locomotive control system, in combination, a plurality of pairs of electric motors, the motors of each pair being connected in series-circuit relation, the motors of one pair being geared to the same axle and the motors of another pair being geared to different axles of the locomotive, means for establishing a connection from the common connection between one pair of motors to the common connection between the other pair of motors, switching means for establishing shunt connections around the field windings of the motors which are geared to the same axle, and relay means responsive to an unbalance in the voltages of the other pair of motors for controlling the operation of said switching means.

13. In a locomotive control system, in combination, a plurality of pairs of electric motors, the motors of each pair being connected in series-circuit relation, the motors of one pair being geared to the same axle and the motors of another pair being geared to different axles of the locomotive, switching means for establishing a connection from the common connection between one pair of motors to the common connection between the other pair of motors, additional switching means for establishing shunt connections around the field windings of the motors which are geared to the same axle, and relay means responsive to an unbalance in the voltages of the other pair of motors for controlling the operation of said switching means.

14. In a locomotive control system, in combination, a pair of electric motors connected in series-circuit relation, a pair of generators for supplying power to the motors, said generators being connected in series-circuit relation, and means for establishing a connection from the common connection between said generators to the common connection between said motors.

15. In a locomotive control system, in combination, a pair of electric motors connected in series-circuit relation, a pair of generators for supplying power to the motors, said generators being electrically connected in series-circuit relation and mechanically connected to the same shaft, switching means for establishing a connection from the common connection between said generators to the common connection between said motors, and relay means responsive to an unbalance in the voltages of the motors for controlling the operation of said switching means.

CYRIL E. BASTON.
LLOYD J. HIBBARD.